(12) United States Patent
Grundström et al.

(10) Patent No.: US 12,190,590 B2
(45) Date of Patent: Jan. 7, 2025

(54) METHOD FOR DETERMINING IMAGES PLAUSIBLE TO HAVE A FALSE NEGATIVE OBJECT DETECTION

(71) Applicant: Axis AB, Lund (SE)

(72) Inventors: Jakob Grundström, Lund (SE); Martin Ljungqvist, Lund (SE); Simon Molin, Lund (SE); Christian Colliander, Lund (SE)

(73) Assignee: Axis AB, Lund (SE)

( * ) Notice: Subject to any disclaimer, the term of this patent is extended or adjusted under 35 U.S.C. 154(b) by 497 days.

(21) Appl. No.: 17/675,019

(22) Filed: Feb. 18, 2022

(65) Prior Publication Data
US 2022/0309792 A1 Sep. 29, 2022

(30) Foreign Application Priority Data

Mar. 25, 2021 (EP) .................................. 21164888

(51) Int. Cl.
*G06V 20/52* (2022.01)
*G06T 7/215* (2017.01)
*G06T 7/73* (2017.01)

(52) U.S. Cl.
CPC .............. *G06V 20/52* (2022.01); *G06T 7/215* (2017.01); *G06T 7/73* (2017.01); *G06T 2207/30241* (2013.01)

(58) Field of Classification Search
CPC ........... G06V 20/52; G06T 7/215; G06T 7/73; G06T 2207/30241
See application file for complete search history.

(56) References Cited

U.S. PATENT DOCUMENTS

2009/0010490 A1 1/2009 Wang et al.
2010/0013656 A1* 1/2010 Brown ............. G08B 13/19613
340/686.6

(Continued)

FOREIGN PATENT DOCUMENTS

CN 105046220 A 11/2015
CN 108734103 A 11/2018

OTHER PUBLICATIONS

The IEE; Oct. 10, 2018, Wei Hanbing et al: "A Multi-Target Detection and Tracking Algorithm Incorporating Historical Trajectories . . . ," Database association No. 18713593; Journal of Xi'an Jiaotong University, Editorial Office of Journal of Xi'an Jiaotong University China, vol. 52, No. 10 pp. 132-140 (Year: 2018).*

(Continued)

*Primary Examiner* — Bobbak Safaipour
*Assistant Examiner* — Ashley L. Hytrek
(74) *Attorney, Agent, or Firm* — Volpe Koenig

(57) ABSTRACT

A method for determining images plausible to have a false negative object detection comprises providing a group of historic trajectories, wherein each historic trajectory comprises a reference track that represents one or more historic tracks and comprises an object class of historic object detections that belong to the one or more historic tracks; performing tracking; performing object detection; for a determined track that does not match any determined object detection, comparing the determined track with reference tracks of historic trajectories for identifying a matching reference track; upon identifying a matching reference track, defining images of the determined track as being plausible to have a false negative object detection for the object class of the historic trajectory comprising the matching reference track; and upon not identifying a matching reference track, defining the determined track as a false positive track.

15 Claims, 4 Drawing Sheets

(56) References Cited

U.S. PATENT DOCUMENTS

2013/0272570 A1    10/2013   Sheng et al.
2017/0270674 A1     9/2017   Shrivastava
2019/0384982 A1    12/2019   Huang et al.

OTHER PUBLICATIONS

Dimitrievski M, Veelaert P, Philips W. Behavioral Pedestrian Tracking Using a Camera and LiDAR Sensors on a Moving Vehicle. Sensors (Basel). Jan. 18, 2019;19(2):391. doi: 10.3390/s19020391. PMID: 30669359; PMCID: PMC6359120. (Year: 2019).*

Extended European Search Report dated Sep. 28, 2021 for European Patent Application No. 21164888.6.

Database Inspec [Online], The Institution of Electrical Engineers, Stevenage, GB; Oct. 10, 2018 (Oct. 10, 2018), Wei Hanbing et al: "A Multi-Target Detection and Tracking Algorithm Incorporating Historical Trajectories for Intelligent Vehicles in Urban Complicated Conditions", Database accession No. 18713593 ; & Journal of Xi'an Jiaotong University, Editorial Office of Journal of Xi'an Jiaotong University China, vol. 52, No. 10 , pp. 132-140, DOI: 10.7652/xjtuxb201810018 (2018).

Sharma et al., "Unsupervised incremental learning for improved object detection in a video," 2012 IEEE Conference on Computer Vision and Pattern Recognition, pp. 3298-3305 (2012).

\* cited by examiner

METHOD FOR DETERMINING IMAGES PLAUSIBLE TO HAVE A FALSE NEGATIVE OBJECT DETECTION

FIELD OF INVENTION

The present invention relates to a method for finding images depicting objects that have not been detected by an object detector. The method may be performed by an image data processing device located on a camera device.

TECHNICAL BACKGROUND

In a camera system, such as a video surveillance system, an occurring feature is detection and tracking of objects in acquired image sequences. Determined tracks and determined object detections are typically associated with each other to indicate that they are caused by the same object. Tracking and object detection may be performed separately by a tracker and an object detector which both can be located in a camera device. However, object detectors sometimes fail to detect objects. Reasons for missed object detections may be that the object differs much in its appearance compared to a typical appearance for the type of object, or that the object detector is not trained to detect objects with such appearance. For example, an object detector that is trained with images taken during a warm weather season when people typically go without outerwear may be poorly prepared to detect people during a cold weather season when they have, e.g., big winter coats and hats. Thus, detections of objects may be missed. Images that depict objects which are missed by the object detector are referred to as "false negatives" or "hard examples". A missed object detection is referred to as a "false negative object detection".

It is desirable to find images having false negative object detections. The images may be used for additional training of the object detector in order to improve its performance. The images may further be used to build up statistics for the object detector or to provide data of missed object detections to an operator or an administrator of a camera system.

However, it is a cumbersome task to find those images since they are not associated with any object detections. The work typically requires a great amount of manual processing and review in order to find images that are plausible to have false negative object detections. The work is tedious and there is also a risk of human errors leading to faulty or misleading results.

Thus, there is a need for improving how to filter out images from an image sequence that are plausible to have missed object detections therein.

SUMMARY

Provide a resource-efficient method of finding images that are plausible to have a false negative object detection would be beneficial. Additionally, lowering the risk of results that are misleading, faulty, or diverging due to manual filtering of images would also be beneficial.

According to a first aspect, these and other objects are achieved, in full or at least in part, by a method according to claim 1.

The method relies on an approach where previous successful matches of tracks and object detections are used as a guide for finding tracks that are plausibly related to an object but where a matching object detection is lacking for some reason. In addition, an object class candidate for the unmatched track is also found. According to the method, an unmatched track is compared with reference tracks that each represents one or more historic tracks that are grouped by object class. In other words, a reference track represents one or more historic tracks of the same object class. An unmatched track that can be paired with a reference track, i.e., that is sufficiently similar to a reference track, is identified as a track for which it is likely that an object detection should, in good circumstances, exist. The images that the track has been detected from are defined as being plausible to have a false negative object detection. In addition, the object class that is matched with the historic tracks that the sufficiently similar reference track represents is provided as the object class of the false negative object detection. In other words, by finding a reference track that is sufficiently similar to the unmatched track, it may be determined that it is likely that the images from which the unmatched track is derived lacks an object detection of a certain object class.

By the proposed method, images that are plausible to have a false negative object detection may thus be filtered from an image sequence in a resource-efficient manner. Further, the filtering may be performed with low, or no, manual work thus reducing the risk of manually caused errors.

The images plausible to have a false negative object detection may be determined in an image processing device, e.g., being part of a monitoring camera, and transmitted to a server or other remote device for verification and further processing. The images may be locally stored on a memory of the image processing device. The images may be used for the purpose of additional training of an object detector, such as the object detector of the monitoring camera.

As used herein, "trajectory" means a paired track and object class. It can be seen as a track that has a detected object belonging to it. In other words, a trajectory is a result of a track and an object which have been verified to belong to each other. The verification and pairing may be performed by using known methods within the technical field of object detection and tracking.

In one embodiment, the method further comprises performing training of the object detector with training data comprising the images that are plausible to have a false negative object detection and comprising the object class of the historic trajectory comprising the matching reference track. In other words, the images that are filtered out by the method may be used to improve the training of the object detector. For example, the object detector may be implemented as an object detection algorithm performed by an object detection neural network. The training of the neural network may be improved by additional training based on the determined training data. Additional training may be performed according to known methods. For example, a copy of the neural network may be additionally trained remotely from a camera performing the method, and subsequently uploaded to the camera to replace the original neural network.

In one embodiment, the images that are determined as plausible to have a false negative object detection are stored on a local memory of an image monitoring device performing the method. Upon a number of images exceeding a predetermined threshold, the images are transmitted to a remote device or server for further processing. By such an embodiment, the images may be transmitted in batches which may be easier to process and handle at a receiver side. In addition, a batch of images may be sent only provided that the batch comprises a minimum number of images which may correspond to the number of images that is needed as base for an additional training of an object detector. Thus, it may be avoided to send images that are useless for training due to the insufficient amount.

The comparison between an unmatched track and reference tracks aims to find a sufficiently similar reference track. If there are several sufficiently similar reference tracks, the most similar one is preferably selected. The condition for being sufficiently similar may vary between embodiments. For example, the condition may be based on the distance between starting points or end points of a reference track and an unmatched track. A reference track may thus be considered to be matching if the reference track has a starting point or an end point within a predetermined distance of a starting point or and end point, respectively, of the determined unmatched track. As a further example, the condition for sufficiently similar may be based on a total deviation calculated between a reference track and an unmatched track. The calculation may be made along the whole or parts of the tracks. A reference track may thus be considered to be matching if the reference track has a total deviation distance from the determined track that is below a predetermined threshold. By total deviation distance is meant an accumulated distance at multiple corresponding positions of the reference track and the determined track along their lengths.

The reference track may represent one or more historic tracks in various manners. Upon representing only one historic track, the reference track may be a direct copy of the one historic track. Upon representing a plurality of historic tracks, the reference track may be an average of the plurality of historic tracks or a regression model may be applied to determine the reference track as a regression line for the plurality of historic tracks. In addition, the reference track may comprise a confidence interval along the track which can be seen as a varying width along the track. When comparing against the reference track, the distance to the reference track may be defined as sufficiently small if the track under comparison falls within the confidence interval. In another embodiment, the plurality of historic tracks are accumulated to form the reference track as an area. The comparison may in that case be performed by evaluating to what extent a track lies within the area. The condition for a positive evaluation outcome may be that the track lies within the area to an extent above a certain threshold or that a sufficiently large relative part of the track, for example at least ⅔ of the track length, lies within the area.

It may be preferred that each reference track represents not one but a plurality of historic tracks, which may need to be at least a minimum number of tracks, in order to lower the impact of each historic track on the reference track. If the reference track is determined by only one or by a low number of tracks, errors or deviations in the historic tracks have greater impact. By setting a minimum number of historic tracks needed for allowing a comparison of a track with a reference track representing the historic tracks, the method may perform well even if a plurality of historic tracks for a reference track include single tracks that have been given an incorrect object class and thus is not supposed to be part of that plurality of historic tracks.

The group of historic trajectories is provided as an input to the method. In case the method is executed in an image processing device, the group of historic trajectories may be formed and stored locally in the same device. For example, matching pairs of object detections and tracks may be stored in a memory of the device upon determining such pairs. All or selected matching pairs may be stored. Local forming of the group of historic trajectories provides the advantage that the one or more historic tracks thereof have been determined in images depicting the same scene and from the same viewing angle as the image sequence with an unmatched track.

In one embodiment, historic tracks are removed from the group of historic trajectories after a certain age such that only historic tracks that are not older than a predetermined time are saved and used as basis for reference tracks. In that way, the group of historic trajectories may adjust faster to changes in how objects are moving in a scene over time by that the reference tracks are not based on old historic tracks. For example, in a scene of a traffic environment, roads or sidewalks may be relocated or adjusted over time which impact tracks caused by vehicles and pedestrians.

The reference tracks of the historic trajectories may be updated on a regular basis to accurately represent historic tracks when new matches of tracks and object detections are added. Thus, in one embodiment, the method may further comprise, for a determined track that matches a determined object detection, updating the reference track of the historic trajectory comprising the determined object detection to represent also the determined track that matches the determined object detection.

In one embodiment, the group of historic trajectories may be stored in a memory located remotely from a device executing the method, for example in a memory located on a remote server from an image processing device executing the method. The group of historic trajectories may be common for a plurality of cameras, comprising image processing devices, that monitors the same or similar scenes. In other words, the method may be executed on a system of cameras, having image processing devices, and for each method the same group of historic trajectories is provided and used for filtering out images plausible to have a false negative object detection. This may be an efficient way of collecting images that may serve as training data for improving the object detectors in the whole system installation.

According to a second aspect, the above is achieved, in full or at least in part, by an image processing device according to claim 9.

The same embodiments that have been set forth in connection to the first aspect are valid for the second aspect as well.

In one embodiment, the processor is further adapted to perform training of the object detector with training data comprising the images plausible to have a false negative object detection and the object class of the historic trajectory comprising the matching reference track.

According to a third aspect, the above discussed and other objects are achieved, in full or at least in part, by a camera according to claim 14.

According to a fourth aspect, the above discussed and other objects are achieved, in full or at least in part, by a system according to claim 15. The system comprises a plurality of cameras having an image processing device executing the method of the first aspect. The group of historic trajectories that is provided to each method is shared within the system, i.e., between the plurality of cameras. In other words, the group of historic trajectories is the same for all cameras in the system. When applied in a camera of the system, a camera specific transform may be applied to the group of historic trajectories to adjust the historic trajectories to suit the viewing angle with which the camera views a scene. In other words, the historic trajectories may be transformed into a shape that they would have if they were determined in images taken by that camera. The group of historic trajectories may be stored locally on at least one camera within the system and shared with the other cameras of the system or may be stored in an additional device which is accessible, at least now and then, for the cameras of the system.

A further scope of applicability will become apparent from the detailed description given below. However, it should be understood that the detailed description and specific examples, while indicating preferred embodiments, are given by way of illustration only, since various changes and modifications within the scope of the claims will become apparent to those skilled in the art from this detailed description.

Hence, it is to be understood that is the embodiments are not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles "a", "an", "the", and "said" are intended to mean that there may be one or more of the elements unless the context clearly dictates otherwise. Furthermore, the word "comprising" does not exclude other elements or steps.

BRIEF DESCRIPTION OF THE DRAWINGS

The concepts will now be described in more detail by way of example and with reference to the accompanying schematic drawings, in which.

DETAILED DESCRIPTION

Figure 1:
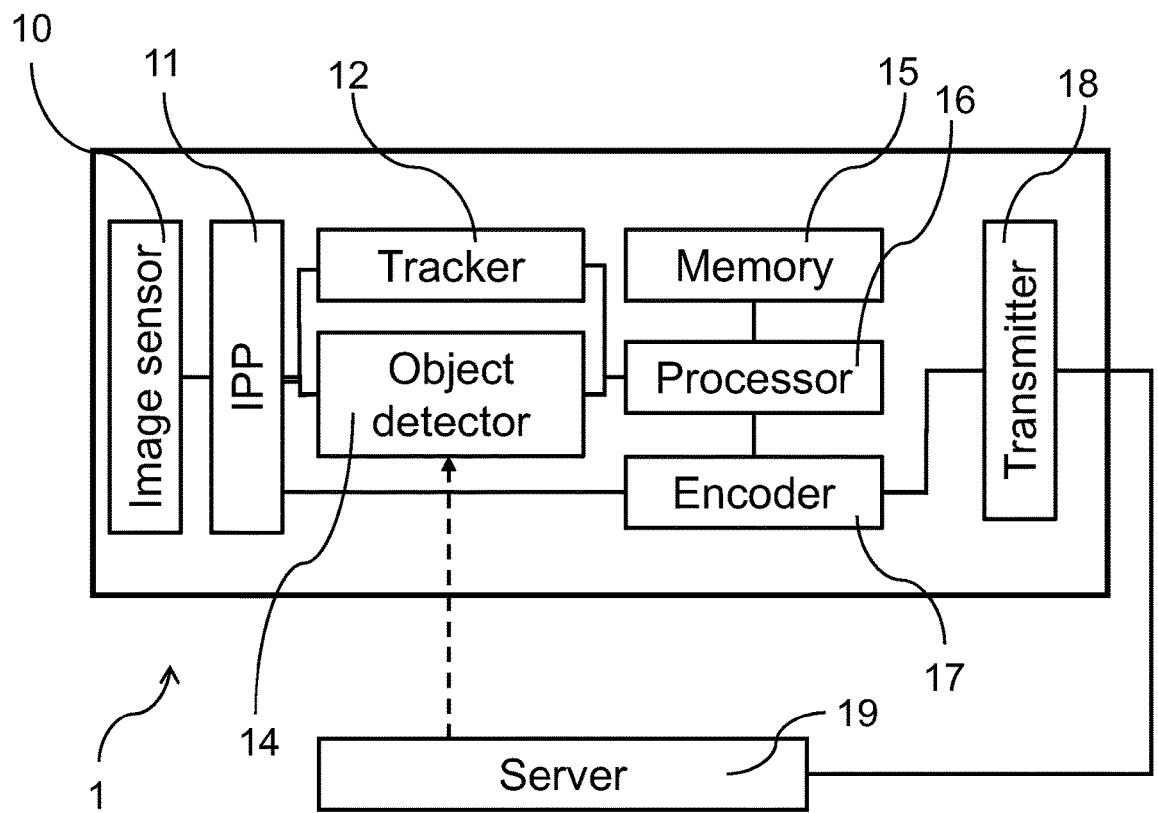
FIG. 1 illustrates an image processing device.

FIG. 1 illustrates an image processing device 1 which is configured to execute a method of determining images plausible to have a false negative object detection. The image processing device 1 comprises an image sensor 10, an image processing pipeline (IPP) section 11, a tracker 12, an object detector 14, a memory 15, a processor 16, an encoder 17, and a transmitter 18. These are all known components to include in an image processing device. The image processing device 1 is also configured to transmit data, via the transmitter 18, to a server 19. The server 19 may have a connection to the object detector 14 which will be explained in detail later.

First, the general functions of the image processing device 1 will be discussed. The main function of the image processing device 1 is to acquire images, and in particular image sequences that correspond to video. The purpose of acquiring video may be surveillance monitoring. The image sensor 10 produces raw image data that is processed by the IPP 11. The IPP 11 may process the raw image data by adjusting, e.g., white balance and noise parameters. Next, processed image data corresponding to an image sequence is analyzed by the tracker 12 and the object detector 14. The purpose of the tracker 12 is to determined tracks of the image sequence. By track is meant a movement of an image area having a certain pixel pattern through the image sequence. The purpose of the object detector 14 is to find objects in the images of the image sequence.

The object detector 14 and the tracker 12 may execute neural networks for performing tracking and object detection. The neural networks may be run locally in the image processing device 1 or be run remotely and accessed by the image processing device 1 when needed. A combination of local and remote execution may also be possible, for example by executing one neural network in the image processing device 1 and one neural network remotely.

Each of the object detector 14 and the tracker 12 is known components for finding tracks and objects in image sequences. It is also known to implement these components in an image processing device such as the one illustrated in FIG. 1.

Tracks determined by the tracker 12 and object detections determined by the object detector 14 are forwarded to the processor 16. The processor 16 is configured to evaluate the object detections and the tracks to determine if there are matches therebetween. In other words, the processor 16 tries to find matching pairs between object detections and tracks. A condition for successful pairing is that the object detection and the track are caused by the same object in the depicted scene. For example, a person walking in the scene will, in good circumstances, cause a track determined by the tracker 12 and an object detection determined by the object detector 14. The person's track and object detection will be matched by the processor 16. The processor 16 uses well-known methods for evaluating tracks and object detections for finding matching pairs. The evaluation may include calculating an Intersection over Union (IoU) value between the track and object detection. A minimum IoU value may be set as condition for a matching pair. Information about the determined matching pairs can be sent as metadata together with the image sequence or be used for other purposes such as adding overlays to images.

The encoder 17 encodes the processed image data in a conventional manner. Various video compression standards may be used, including AVC and HEVC.

Figure 3:
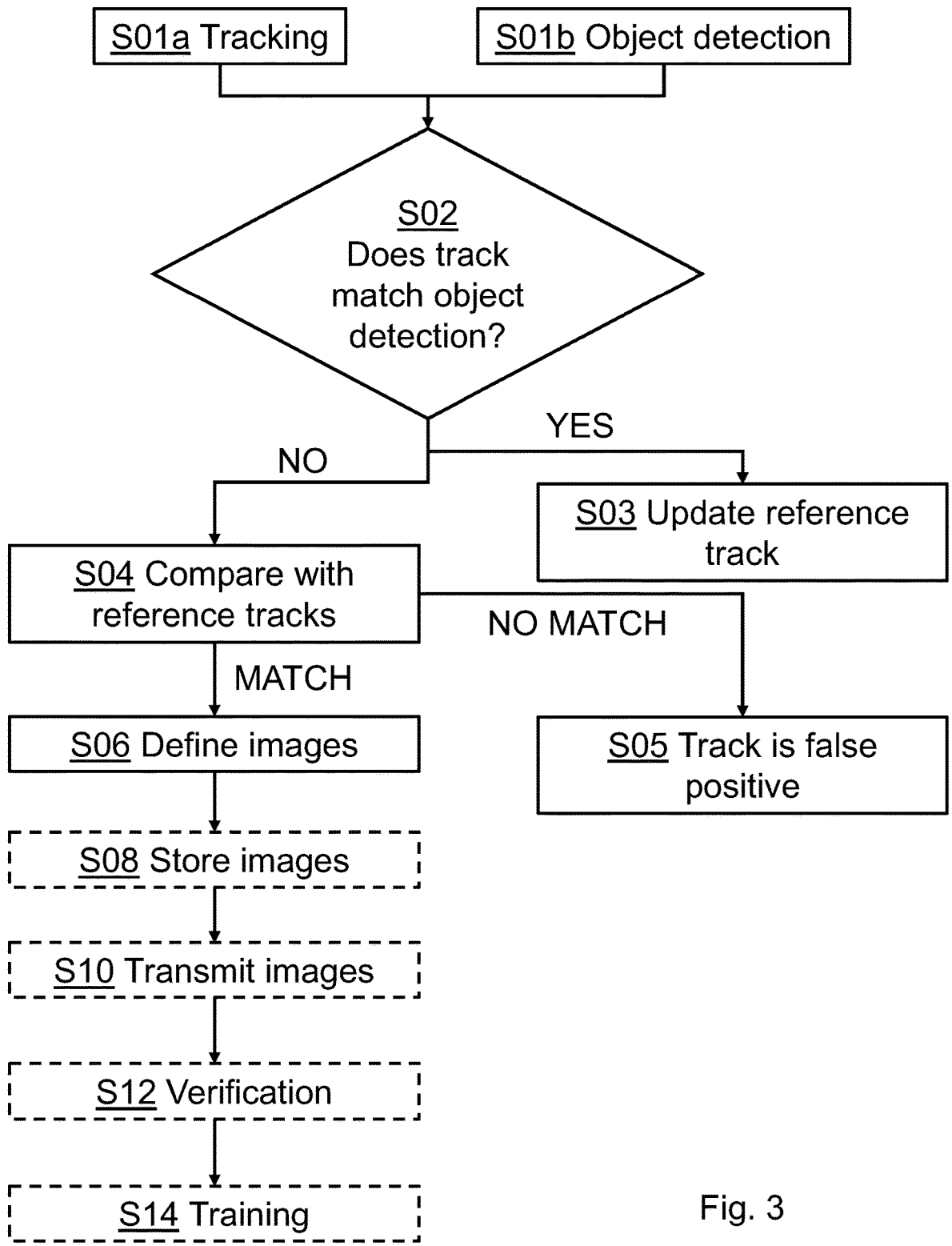
FIG. 3 is a flow chart illustrating a method according to an embodiment.

Going more into details, a method of determining images plausible to have a false negative object detection will now be disclosed with further reference to FIG. 3. The method begins with the already discussed steps of tracking S01a and object detection S01b based on acquired images of an image sequence. The processor 16 evaluates the determined tracks and object detections to find matching pairs which is represented by step S02 in FIG. 3. The method of finding images plausible to have false negative object detections is based on first finding tracks that have no matching object detections and then evaluating if it is plausible, based on historic matches, that a matching object detection has been missed by the object detector 14 for some reason. For this purpose, an unmatched track, i.e., a track that has not been matched with an object detection in step S02, is compared in a step S04 with reference tracks that each represents one or more historic tracks. If a match is found, it is plausible that the unmatched track was supposed to be matched to an object detection of the object class associated with that reference track.

Figure 2:
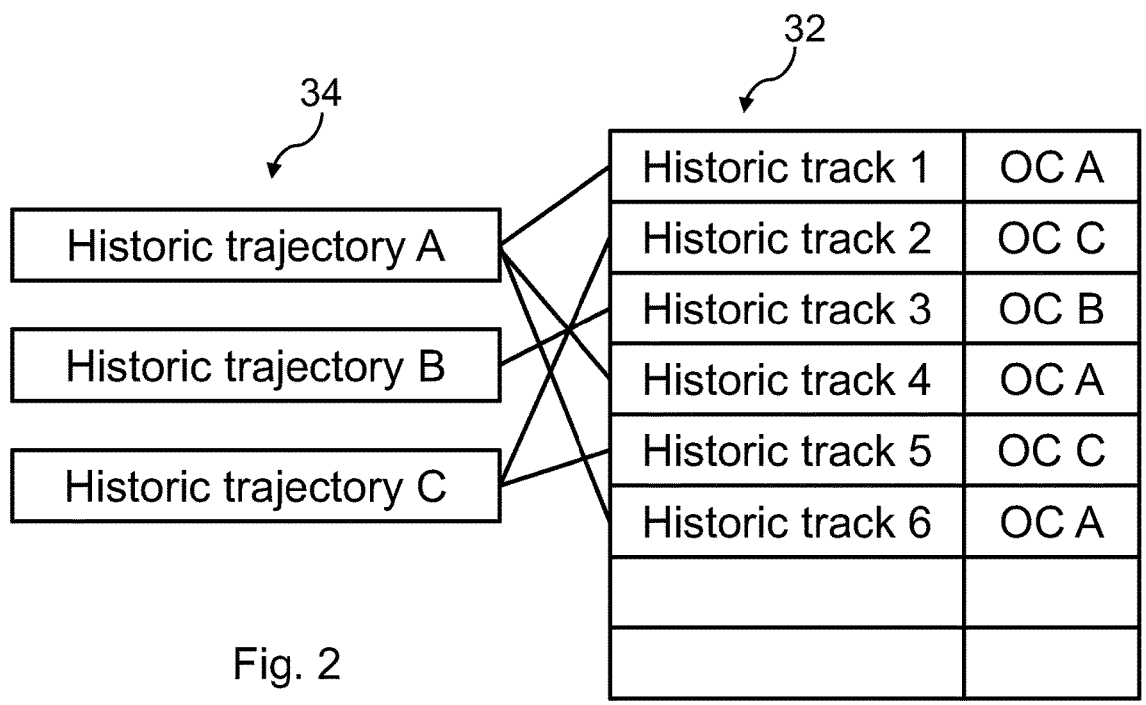
FIG. 2 illustrates relations between historic trajectories, historic tracks, and object classes.

The method thus needs access to reference tracks representing historic tracks 32. These will now be explained in more detail with further reference to FIG. 2 that illustrates relationships between historic tracks 32, object classes, and historic trajectories 34. In this figure, three historic trajectories A, B, and C are formed and comprises historic tracks 1-6 and associated object classes OC A-C. The historic tracks 1, 4, and 6 are all associated with the object class OC A and comprised in the historic trajectory A. The historic track 3 is associated with the object class OC B and comprised in the historic trajectory B. The historic tracks 2 and 5 are associated with the object class OC C and comprised in the historic trajectory C. Thus, each of the historic tracks 1-6 has been matched with an object detection. The object class OC of the matching object detection is the same for all historic tracks 32 within the same historic trajectory. A reference track represents historic tracks 32 of a single object class. Different reference tracks typically represent historic tracks 32 of different object classes. Thus, each reference track can be said to be associated with an object class and the reference track together with the associated object class form a historic trajectory 34.

The historic trajectories 34 may be stored as a database or a list, or in any other suitable format, in the memory 15 of the image processing device 1. Alternatively, the group of historic trajectories 34 may be located remotely and accessed by the processor 16 when needed. The historic tracks 32 may also be stored in the same manner, if needed for the method. For example, in an embodiment where the reference tracks are updated based on added or removed historic tracks 32, the historic tracks 32 may need to be stored as well. As input to the method, at least the group of historic trajectories 34 are provided for the evaluation of unmatched tracks. As indicated, the group of historic trajectories 34 may be regularly updated. For example, tracks that match an object detection may be added to the historic trajectory 34 having the object class of matching object detection. The reference track of that historic trajectory 34 is updated, as indicated by step S03, based on the newly added historic trajectory 34 such that the reference track represents this historic track 32 as well. In another example, the historic trajectories 34 are updated on a regular basis to discard historic tracks 32 above a certain age. At the same time, the reference tracks are updated or regenerated to reflect the updated historic trajectories 34. Thus, the reference tracks adapt to any changes of object travel path in a scene, for example if a sidewalk is rebuilt into a combined sidewalk and bicycle lane or a road is temporally relocated due to road constructions.

The method is thus based on a realization that images plausible to have a false negative object detection can be identified by finding images with unmatched tracks that are similar to historic tracks 32 with matching object detections. Based on this approach, unmatched tracks that are plausible to have a missed object detection can be filtered out from all unmatched tracks by finding a matching reference track. Further, since the reference track is associated with an object class, it is also possible to have a qualitative guess of which object class the missed object detection would have if caught.

The outcome from the comparison of the step S04 between the unmatched track and reference tracks is either that a match is found or that a match is not found. In case a match is found, the method continues with a step S06 of defining images that the unmatched track belongs to as being plausible to have a false negative object detection for the object class of the historic trajectory 34 that includes the matching reference track. In other words, the images that the tracker have determined the unmatched track from are defined as being plausible to have a false negative object detection if the unmatched track matches a reference track. These images may be added to a group of images that is stored in the memory 15, as indicated by step S08. The group of images may be transmitted S10, by the transmitter 18, to the server 19. The transmission may be made on condition that the group of images has reached a certain number of images to avoid sending groups of images that are too small to be useful for an intended application. For example, the group of images may be used for forming training data for an object detector. For the training data to be useful, the number of images therein should exceed a certain threshold.

With or without the step S10 of transmitting the group of images, the method may comprise a step S12 of verifying the images that have been filtered out to be plausible to have a false negative object detection. The verification may be performed in an automated or manual manner. For example, the images may be verified by manually going through the images to confirm whether there is an object corresponding to the track. Alternatively, the images may be analyzed by a high precision object detection algorithm. Such an object detection algorithm has a high processing power demand. The verification may be performed on a remote server having high processing capacity. In one embodiment, multiple object detection algorithms may be set to analyze the filtered images. A condition for the verification may in that case be set as a minimum number of positive outcomes from the algorithms with respect to the suspected missing object.

As mentioned, the group of images, with or without verification, may be used for training an object detector, and in particular the object detector 14 of the image processing device 1. For this purpose, training data comprising the image plausible to have a false negative object detection associated with their presumed object classes may be formed. By performing an additional training of the object detector 14, its performance may be increased. The additional training may be performed by the server 19 that has access to the object detector 14. However, the actual training may be performed in the server 19. For example, if the object detector is in the form of a neural network, a copy of the neural network may be downloaded to the server 19 and additionally trained with the training data before uploading it again to the object detector 14. The additional training and updates of the object detector 14 may be performed on a regular basis or be triggered by receiving a group of images from the image processing device 1. The training data could also be used for training object detectors of other image processing devices. In particular, image processing devices having a similar field of view may benefit from the training. For example, if several cameras in a camera system monitor the same scene and have overlapping fields of view, at least to a great extent, all these cameras may share the same training data. However, all these cameras do not necessarily take part in forming the training data, instead it might be that only one or a couple of these cameras contribute images to the training data.

Going back to FIG. 3, the other outcome from the comparing step S04 is that no match is found between the unmatched track and the reference tracks. In that case, and as indicated by step S05, the unmatched track is defined as a false positive track, i.e., as a track that has been determined by the tracker 12 without there being an object in the scene causing the track.

Thus, by the step of comparing S04 unmatched track with reference tracks, true positive tracks for which an object detection is missing are separated from false positive tracks. Thus, false positive tracks can be discarded and not cause any unnecessary verification. Alternatively, for applications where it may be interesting to find false positive tracks, for example in order to improve the tracker's 12 performance, the method is beneficial in that those tracks are filtered out from the other tracks.

Going more into detail of the comparison between an unmatched track and reference tracks, exemplifying embodiments will now be disclosed with further reference to FIGS. 4A-4C and FIGS. 5A-5C.

Figure 4A:
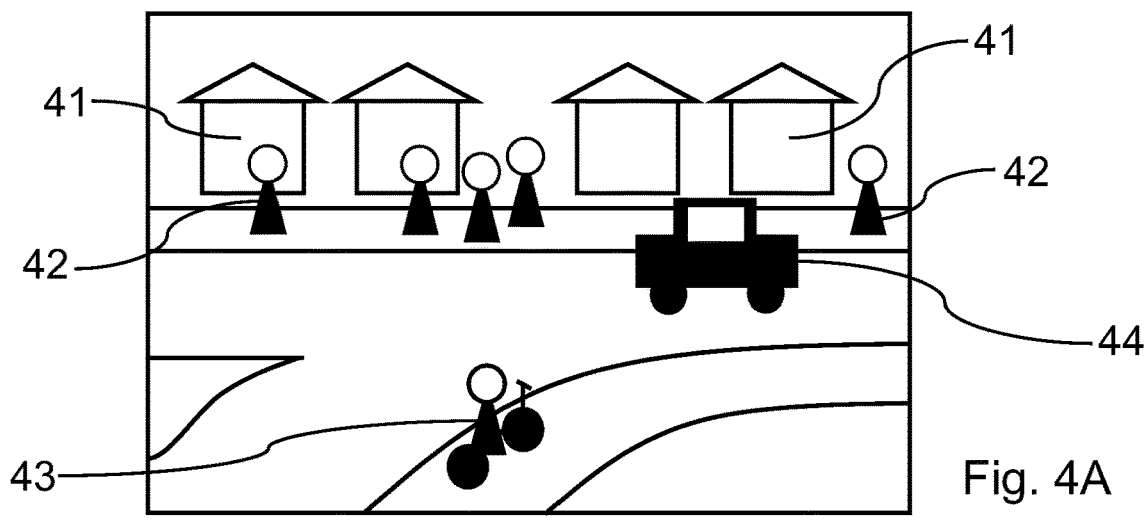
FIG. 4A illustrates a first scene as viewed by a camera.
Figure 4B:
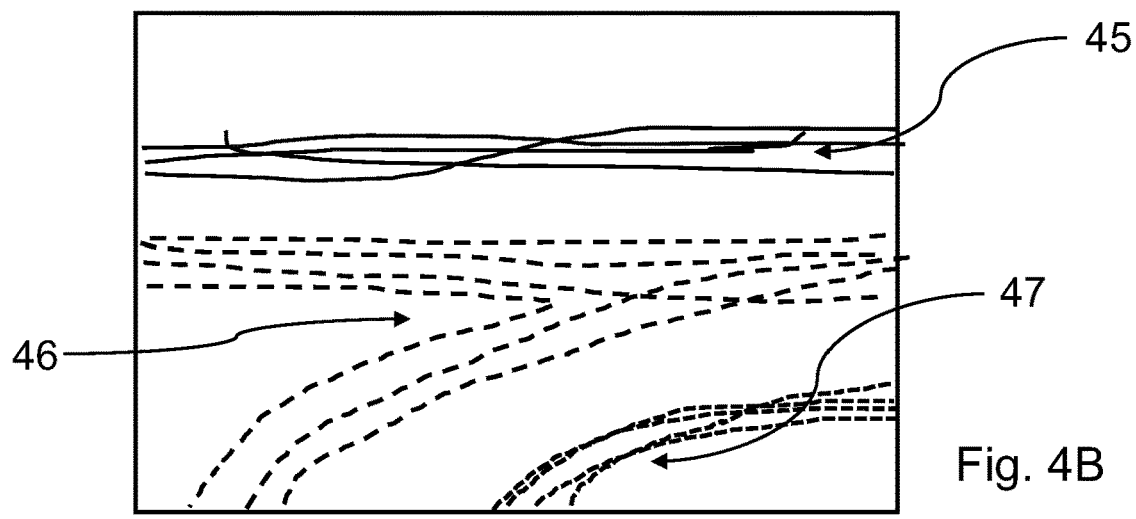
FIG. 4B illustrates tracks determined in images of the first scene.

FIG. 4A illustrates a scene as viewed by a camera comprising an image processing device 1 of FIG. 1. The scene includes static objects including buildings 41 and moving objects including pedestrians 42, a cyclist 43, and a car 44. The camera is continuously performing tracking and object detection on acquired image sequences depicting the scene. The resulting tracks and object detections are evaluated to find matches as discussed above. FIG. 4B illustrates what tracks with matching object detections can look like. Different line dash formats represent different pluralities of tracks. Tracks that are matched with object detections of the object class pedestrians walking on a sidewalk are illustrated as solid lines 47 in the upper part of the view. Cars moving through the scene on a road have caused tracks illustrated with larger dashed lines 46 in the middle of the view. In the lower right part of the image, cyclists moving on the bicycle lane have caused tracks illustrated with smaller dashed lines 47. The illustrated tracks form historic tracks 32 for the scene. Together with the object class of the matched object detection, the historic tracks 32 are part of different historic trajectories 34 based on their object class. It is noted that multiple historic trajectories 34 may exist with the same object class. For example, the dashed lines 46 may represent two pluralities of tracks that represent cars that have followed the straight part of the road in a first plurality of tracks and cars that have followed the curved part of the road in a second plurality of tracks. This plurality of tracks can each form a historic trajectory 34 with the object class car. In a similar example, if a scene depicts two separate sidewalks, there may exist one plurality of historic tracks 32 for each sidewalk area for the object class pedestrians.

If a matching object detection is not found for a track, this unmatched track is compared with reference tracks for determining whether the unmatched track is a false positive track, or a positive track caused by an object that was missed by the object detector. As described above, this is done by comparing the unmatched track with reference tracks 450, 460, and 470 illustrated in FIG. 4C. In this example, the dashed lines 46 form one plurality of historic tracks 32 and thus there exist one reference track 460 for these tracks. The reference tracks 450, 460, 470 may be formed by averaging the plurality of historic tracks 32 of each historic trajectory 34. The reference tracks 450, 460, 470 may be seen as a track that represents all historic tracks 32 in a plurality of historic tracks 32 for an object class along an area in the scene. A reference track may be compared to a forest path which has been formed by people walking along a forest area. However, similar to the forest path, the reference track does not necessarily correspond exactly to any one of the historic tracks 32.

Figure 4C:
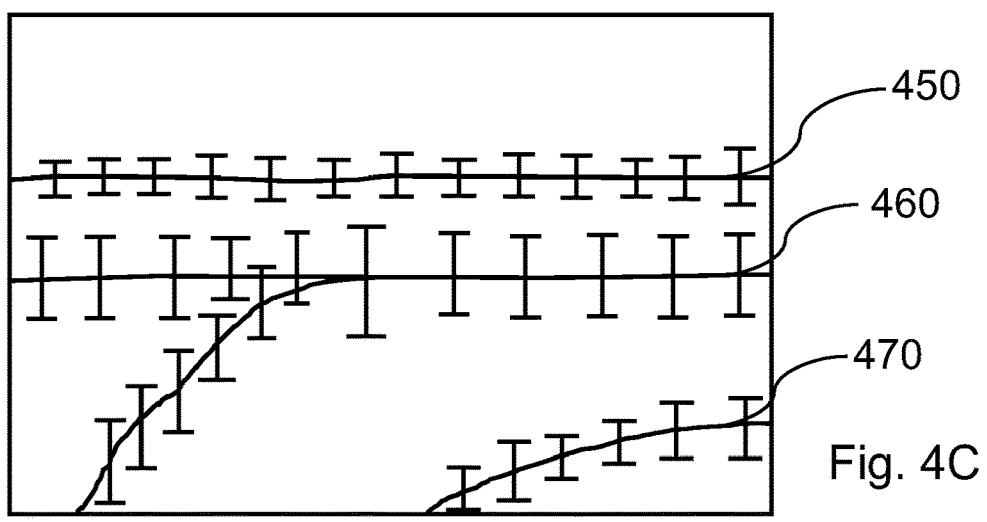
FIG. 4C illustrates reference tracks representing the tracks of FIG. 4B.

FIG. 4C also indicates tolerance intervals along points of each reference track 450, 460, 470. These tolerance intervals are used for an embodiment of the comparison between unmatched tracks and the reference tracks 450, 460, 470. In order for an unmatched track to match any of the reference tracks 450, 460, 470, the unmatched track should be within the tolerance interval at every point, or at least at a minimum number of points, for a certain reference track. The tolerance intervals may be determined based on how much historic tracks 32 are spread out at the different points. If the spread is lower, a lower tolerance interval may be set compared to if the spread is higher.

According to another embodiment, in order for an unmatched track to match any of the reference tracks 450, 460, 470, the total deviation distance between the unmatched track and a certain reference track should be below a predetermined threshold. The deviation distance is the difference, as can be determined by the images, between the tracks at a certain point. The total deviation distance is the sum of all deviation distances for a certain reference track. The comparison can be implemented as determining the smallest possible difference between the reference track and the unmatched track at a number of points along the reference track and summing the determined differences into a total deviation distance for comparison with a threshold.

Figure 5A:
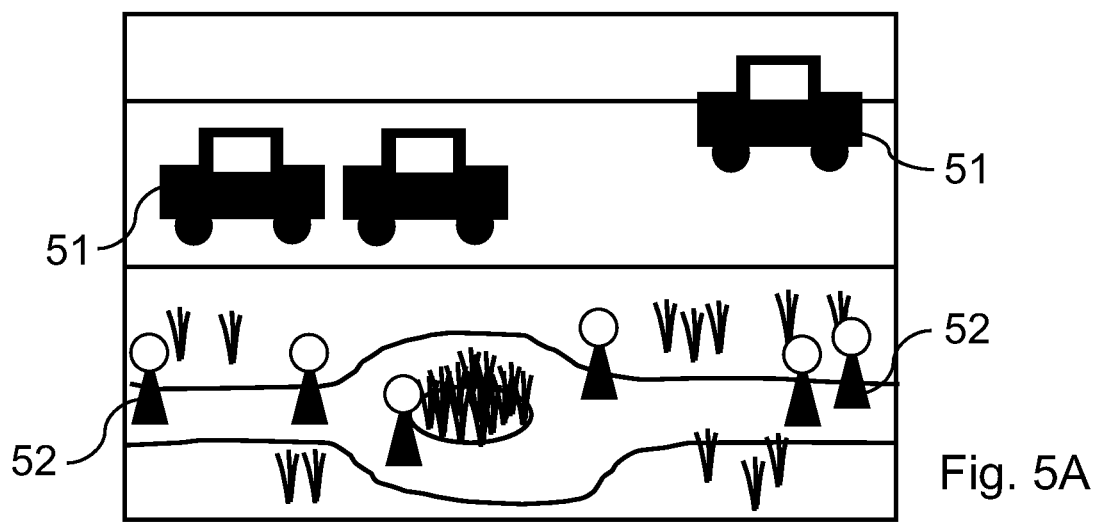
FIG. 5A illustrates a second scene as viewed by a camera.
Figure 5B:
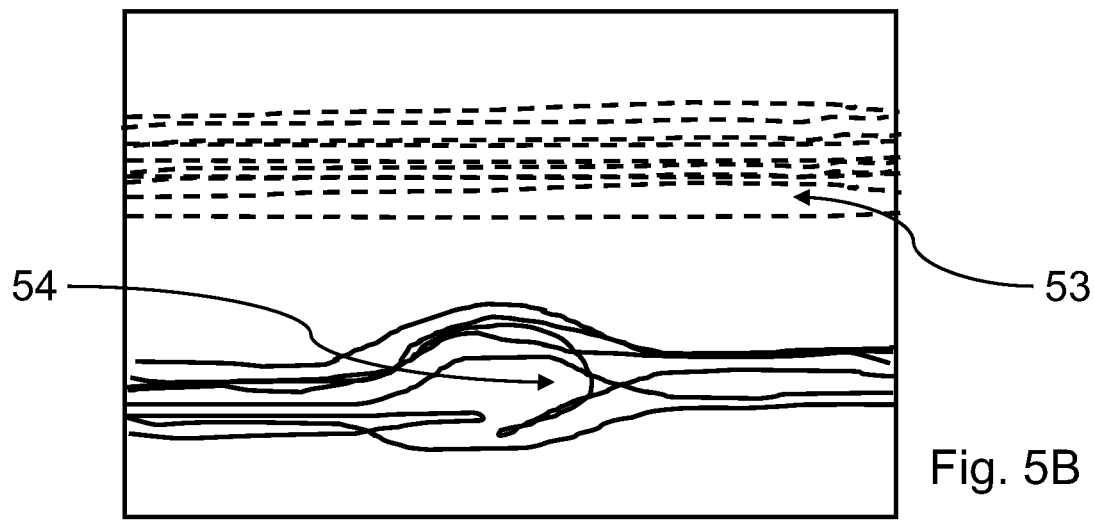
FIG. 5B illustrates tracks determined in images of the second scene.

FIG. 5A illustrates another scene that is monitored by a camera with the same configuration as the previously discussed cameras. The scene includes a road with moving vehicles 51 and a sidewalk with pedestrians 52. Tracking and object detections of the camera provides the historic tracks 32 as illustrated in FIG. 5B. As in previous embodiment, these tracks have been matched with objects detections. The dashed lines 53 indicate tracks that have been matched with object detections comprising the object class car, and the solid lines 54 indicate tracks that have been matched with object detections comprising the object class pedestrian.

Figure 5C:
FIG. 5C illustrates reference tracks representing the tracks of FIG. 5B.

The tracks 53, 54 are represented by reference tracks 530, 540 that are illustrated in FIG. 5C. In this embodiment, the comparison of an unmatched track against the reference tracks 530, 540 is performed by checking if the starting points 55a, 56a or end points 55b, 56b of the unmatched track and a certain reference track is within a predetermined distance from each other. In other words, the unmatched track is defined as matching a reference track if the distance between the starting points 55a, 56a or the end points 55b, 56b of the tracks are sufficiently close to each other. For increased accuracy, it may be desired to configure a condition comprising that a starting point of the reference track is within a first threshold distance from a starting or end point of the unmatched track and, in addition, that an end point of the reference track is within a second, same or different from the first, threshold distance from the other end of the unmatched track. In other words, an unmatched track must begin and end at similar positions in the image as a certain reference track in order to match that reference track. In a similar embodiment, it may suffice that the end points of an unmatched track are sufficiently close to end points of a reference track. In other words, the direction of the tracks that are compared are not taken into account in the comparison.

A comparison of the unmatched track with reference tracks which is based on comparing starting or end points is a quick evaluation method which requires little processing. It is thus advantageous to use, provided that the scene is of a suitable structure. In the example of FIGS. 5A-5C, the scene comprises distinct areas where object enter or leave the scene which makes it a suitable candidate for an approach of comparing starting/end points.

It is noted that the illustrated embodiments provide simplified versions of scenarios in that the number of historic tracks 32 is low and that the pluralities of historic tracks 32 are located separated from each other. In a real implementation, historic tracks 32 of different object classes may be located in overlapping image areas. An unmatched track may thus be determined to be similar to a plurality of reference tracks of different object classes. In that case, all object classes of sufficiently similar reference tracks may be provided as object classes for a potential missed object detection. In a verification process of the images that are plausible to have a false negative object detection, it can be determined if there was a missed object detection and also of which object class of the object class candidates.

According to one embodiment, a system of cameras is provided where each camera implements the method according to FIG. 3. The system of cameras may be configured to monitor the same scene with overlapping fields of view, or be configured to monitor the same type of scene, for example different segments of a road. The historic trajectories 34 are shared between the cameras of the system. In case the cameras are monitoring the same scene, the historic trajectories 34 may be transformed before they are applied to images of any of the cameras in the system. The transforms are camera specific and designed to adapt the historic trajectories 34 in view of the different viewing angles that the cameras of the system may have of the scene. In other words, the historic trajectories 34 are transformed into the form or shape they would have had if they were found in images of a specific camera before being applied in filtering of images being plausible to have a false negative object detection from images captured by that camera.

Thus, unmatched tracks from any of the cameras in a system may be compared with the same reference tracks, or with camera specific transformed reference tracks that originate from the same reference tracks. The historic trajectories 34 may be updated by any camera of the system, meaning that all cameras can benefit from an update from a single camera within the system.

It may be noted that although this disclosure relates to the method of determining images plausible to have a false negative object detection as executed by an image processing device, or a camera comprising such a device, the method may also be executed in other suitable processing devices. For example, the method may be executed on a server to which the image sequence is provided by one or more cameras. Moreover, it is appreciated that the concept of the invention may be embodied in different forms, for example in one embodiment historic trajectories 34 can have a common reference track. The reference track is thus the same for a plurality of historic trajectories 34. This may be the case in a scenario when monitoring a scene of a road where vehicles of different object classes cause similar tracks. Upon an unmatched track being determined to match with such a reference track, all object classes related to that reference track may be set as object class to the images of the determined track as being plausible to have a false negative object detection.

Thus, the concepts set forth herein should not be limited to the shown embodiments but should only be defined by the appended claims.

The invention claimed is:

1. A method for determining images plausible to have a false negative object detection in an image sequence acquired by an image sensor, the method comprising:
   providing a group of historic trajectories, wherein each historic trajectory comprises a reference track that represents a plurality of historic tracks and comprises an object class of historic object detections that belong to the plurality of historic tracks,
   performing, by a tracker, tracking for determining tracks in the image sequence,
   performing, by an object detector, object detection for determining object detections in the image sequence, wherein the object detector includes a neural network,
   for a determined track that does not match any determined object detection, comparing the determined track with reference tracks of historic trajectories in the group of historic trajectories for identifying a matching reference track,
   upon identifying a matching reference track, defining images of the determined track as being plausible to have a false negative object detection for the object class of the historic trajectory comprising the matching reference track, wherein the defined images are used to train the neural network of object detector, and
   upon not identifying a matching reference track, defining the determined track as a false positive track.

2. The method according to claim 1, further comprising:
   performing training of the object detector with training data comprising the images plausible to have a false negative object detection and the object class of the historic trajectory comprising the matching reference track.

3. The method according to claim 1, further comprising adding the images plausible to have a false negative object detection to a group of images stored on a memory.

4. The method according to claim 1, wherein the matching reference track has a starting point or an end point within a predetermined distance of a starting point or an end point, respectively, of the determined track.

5. The method according to claim 1, wherein the matching reference track has a total deviation distance from the determined track that is below a predetermined threshold.

6. The method according to claim 1, wherein the reference track is an average of the plurality of historic tracks.

7. The method according to claim 1, wherein the plurality of historic tracks have been determined in images depicting the same scene as the image sequence.

8. The method according to claim 1, further comprising:
   for a determined track that matches a determined object detection,
   updating the reference track of the historic trajectory comprising the object class of the determined object detection to represent also the determined track that matches the determined object detection.

9. A non-transitory computer readable storage medium having stored thereon instructions for implementing a method for determining images plausible to have a false negative object detection in an image sequence acquired by an image sensor, when executed on a device having processing capabilities, the method comprising:
   providing a group of historic trajectories, wherein each historic trajectory comprises a reference track that represents a plurality of historic tracks and comprises an object class of historic object detections that belong to the plurality of historic tracks,
   performing, by a tracker, tracking for determining tracks in the image sequence,
   performing, by an object detector, object detection for determining object detections in the image sequence, wherein the object detector includes a neural network,
   for a determined track that does not match any determined object detection, comparing the determined track with reference tracks of historic trajectories in the group of historic trajectories for identifying a matching reference track,
   upon identifying a matching reference track, defining images of the determined track as being plausible to have a false negative object detection for the object class of the historic trajectory comprising the matching reference track, wherein the defined images are used to train of the neural network of object detector, and upon not identifying a matching reference track, defining the determined track as a false positive track.

10. An image processing device adapted to determine images plausible to have a false negative object detection in an image sequence acquired by an image sensor, the image processing device comprising:

a memory adapted to provide access to a group of historic trajectories stored thereon, wherein each historic trajectory comprises a reference track that represents a plurality of historic tracks and comprises an object class of historic object detections that belong to the plurality of historic tracks, a tracker adapted to perform tracking for determining tracks in the image sequence, an object detector adapted to perform object detection for determining object detections in the image sequence, wherein the object detector includes a neural network; and a processor adapted to:
for a determined track that does not match any determined object detection, compare the determined track with reference tracks of historic trajectories in the group of historic trajectories for identifying a matching reference track, upon identifying a matching reference track, define images of the determined track as being plausible to have a false negative object detection for the object class of the historic trajectory comprising the matching reference track, wherein the defined images are used to train of the neural network of object detector, and upon not identifying a matching reference track, define the determined track as a false positive track.

11. The image processing device according to claim 10, wherein the processor is further adapted to add the images plausible to have a false negative object detection to a group of images stored in the memory.

12. The image processing device according to claim 10, wherein the processor is further adapted to:
for a determined track that matches a determined object detection, update the reference track of the historic trajectory comprising the determined object detection to represent also the determined track that matches the determined object detection.

13. The image processing device according to claim 10, wherein the processor is further adapted to perform training of the object detector with training data comprising the images plausible to have a false negative object detection and the object class of the historic trajectory comprising the matching reference track.

14. A camera comprising the image processing device according to claim 10.

15. A system comprising a plurality of cameras according to claim 14 that are arranged to monitor the same scene, wherein the group of historic trajectories are shared by the plurality of cameras.

* * * * *